May 11, 1948. H. C. GRAVES, JR., ET AL 2,441,485
SWITCHBOARD
Filed June 8, 1944 7 Sheets-Sheet 1

Fig. 1

INVENTOR.
HERBERT C. GRAVES, JR.
BY WALTER H. SCHYMIK
CLAYTON BRADBURY
ATTORNEY

INVENTOR.
HERBERT C. GRAVES, JR.
WALTER H. SCHYMIK
CLAYTON BRADBURY
BY
ATTORNEY

Patented May 11, 1948

2,441,485

UNITED STATES PATENT OFFICE 2,441,485

SWITCHBOARD

Herbert C. Graves, Jr., West Chester, Walter Haines Schymik, Oreland, and Clayton Bradbury, Philadelphia, Pa., assignors to I-T-E Circuit Breaker Company, Philadelphia, Pa., a corporation of Pennsylvania Application June 8, 1944, Serial No. 539,336

6 Claims. (Cl. 175—298)

Our present invention relates to circuit breaker mounting means and more particularly to means for mounting a plurality of thermal magnetic circuit breakers in a switchboard.

Our invention contemplates the arrangement of the circuit breaker mounting means in such a manner that individual circuit breakers may readily be attached or removed from the switchboard from the front thereof with complete safety for the operator and in the simplest possible manner.

Heretofore, most switchboards have been so arranged that it has been necessary to obtain access to the rear of the switchboard and to work among the bus bars thereof to disconnect any particular circuit breaker and remove the same. This ordinarily requires a complete shutdown of the switchboard, or, at least, that entire section in which an operator is working in order to prevent injury to the operator.

Our novel arrangement of the circuit breaker mounting means, so that the circuit breaker may be removed from the front of the switchboard, requires only that the particular circuit breaker which is to be removed be set at the "off" position prior to the removal.

Our invention also contemplates the arrangement of the circuit breaker itself so that it may readily be handled during removal without danger to the operator.

Ordinarily in small circuit breakers which are mounted on a switchboard, the terminal members are so arranged that they may inadvertently be contacted by the operator's fingers during removal. This is so because circuit breakers are not always back connected and must be arranged to permit front connection where necessary. When opposite terminals are thus contacted, the circuit breaker, even though it is in the "off" position, is bypassed by the body of the operator who may then be injured or electrocuted. Our invention includes specific means inserted in the circuit breaker itself to prevent any such inadvertent contact with the terminal members of the circuit breaker.

Thus, a primary object of our invention is the provision of simplified mounting means for circuit breakers in a switchboard wherein the circuit breakers may be attached, removed or exchanged from the front of the switchboard.

Another object of our invention is the incorporation of safety features in the mounting means which will prevent injury to the operator while working on the switchboard.

Another object of our invention is the incorporation of further safety means in the circuit breaker itself to prevent injury to the operator while removing or replacing a circuit breaker on the switchboard.

Another object of our invention is the arrangement of the mounting means for circuit breakers on a switchboard in such a manner that the mounting means may readily be adjusted to any slight variation in the surfaces or dimensions of any particular circuit breaker housing or part.

A further object of this invention is to provide a totally enclosed safety switchboard, with circuit breakers that are removable from the front without disturbing the circuit breaker connections and in addition the circuit breaker is completely enclosed in insulation material with no exposed live parts.

Still another object is to provide a safety type switchboard wherein each circuit breaker or group of circuit breakers is mounted in a steel enclosed compartment so as to reduce to a minimum the possibility of communicating ionized gas, either due to circuit breaker operation or even circuit breaker failure, into the other sections of the switchboard such as the bus compartment.

These and many other objects of our invention will become apparent in the following description and drawings which.

Figure 1:
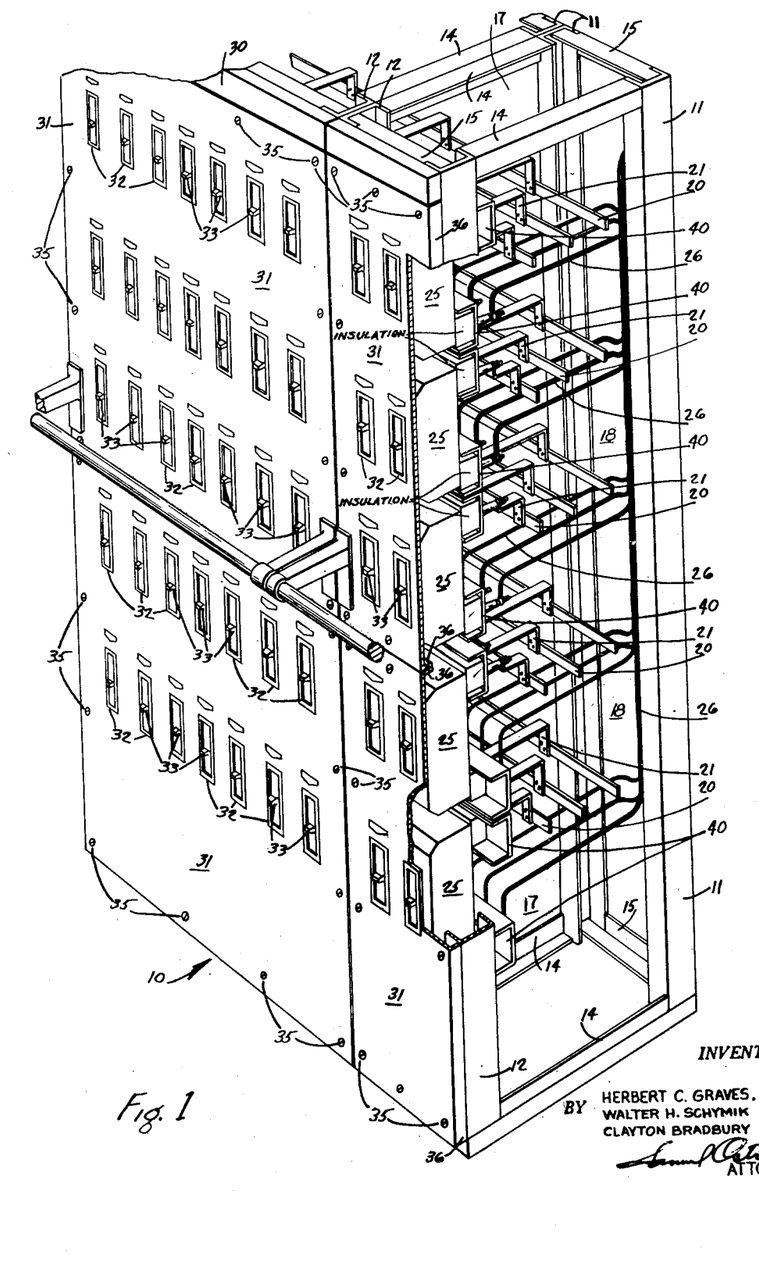
Figure 1 is a view in perspective, partly broken away, of a dead front switchboard including the novel mounting means and novel circuit breakers of our invention.

Referring now to Figure 1, we have here shown our novel dead front switchboard 10 (the top and side plates being removed), which comprises vertical U-shaped supporting posts 11 and 12 of structural steel arranged with their flanges running parallel to the front of the switchboard and horizontal connecting members 14 and 15 also of structural steel interconnecting the vertical posts 11 and 12 to form a complete framework. The framework is provided with suitable supports of insulated material for supporting the various bus bars 20, 20 which are fed from a source of supply, not shown.

Current is taken from the bus bars 20 by the bus taps 21, 21 and is led to the various circuit breakers 25. After passing through the circuit breakers 25, current then passes out through the cables 26 to the various loads to which the cables are connected.

A top finishing piece or cornice 30 is secured across the upper ends of the front part of the framework to provide a finished appearance for the front of the switchboard; and steel panels 31, 31, having appropriate openings 32, 32 registering with the operating handles 33 of the circuit breakers 25, are removably secured to the front frame by the screws 35 which enter appropriate tapped openings in the frame members. Circuit breakers 25 may be of any well-known construction such as shown in my co-pending application Serial No. 454,163, filed August 8, 1942, now abandoned.

Flanges 36 on the panels 31 serve to space the panels appropriately from the frame supporting members to provide clearance for the front ends of the circuit breakers 25 so that only the handle 33 thereof may project through the openings 32.

The front of the switchboard, by reason of the panels 31, the flanges 36 of which are in contact with each other, forms a dead front or grounded front which will serve as a low resistance by-pass protecting the operator from any fault which may occur at any one circuit breaker.

A plurality of horizontal channels 40 are provided supported between the vertical front post members 12 by the bolts 40a to support the mounting means for the circuit breakers hereinafter described. A channel is provided for each row of terminals. Thus, where, as seen in Figure 1, five rows of circuit breakers are provided, each circuit breaker having terminals at the top and bottom ends, ten such horizontal channels 40 must be provided.

Figure 2:
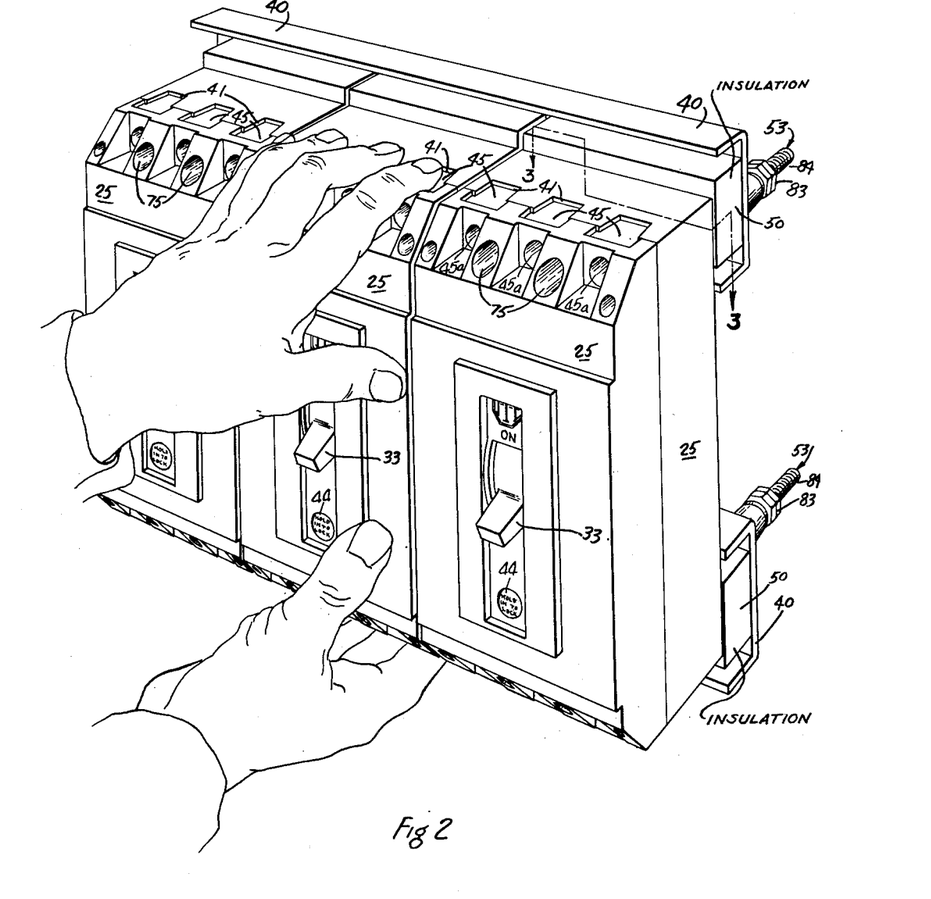
Figure 2 is a view in perspective showing the manner in which safety to the operator is assured while the circuit breaker is being removed or replaced.

Referring now to Figure 2, we have here shown a portion of the switchboard of Figure 1 with the front panels 31 removed, so that access may be obtained to the circuit breakers 25.

As seen in Figure 2, the normal method of removal of the circuit breakers is to grasp the top and bottom end of any particular circuit breaker simultaneously and pull the same straight out. In the ordinary construction of circuit breakers, adapted either for front or back mounting, the terminal members are accessible through the top and bottom openings 41 on each circuit breaker. Thus, the circuit breakers 25 are ordinarily constructed so that a connection may be made thereto through the top and bottom openings 41. This is so even though additional back connecting members are provided. This becomes more obvious from Figure 3, where it will be seen that the end terminal member 42 is accessible through the openings 41. Instead, however, of taking the connection out directly through the opening 41, an additional connecting bolt 43 is provided to take the connection out through the back of the circuit breaker. This will hereinafter be more fully explained.

For the present, referring back again to Figure 2, it will be seen that with the ordinary circuit breaker construction, the operator may by-pass the current through the circuit breaker through his body and suffer a severe shock. Our invention contemplates, therefore, the insertion of fiber pieces 45 in the openings 41 to cover the terminal members 42 and the other elements connected thereto, so that the operator's fingers cannot contact the terminal members to by-pass the current through his body.

In Figures 2, 3, 4 and 5, we have also shown the mounting means for our circuit breakers in greater detail.

The mounting means comprises a mounting block 50 individual to each end of each circuit breaker. This mounting block 50 is formed of a piece of molded Bakelite or similar insulating material designed to fill up the channel 40 in which it is positioned.

The mounting block 50 also carries integral therewith a plurality of tubular extensions 51 (see Figure 3) having the cylindrical openings 52 therein to position the draw-out lugs 53 hereinafter described.

Figures 4, 8:
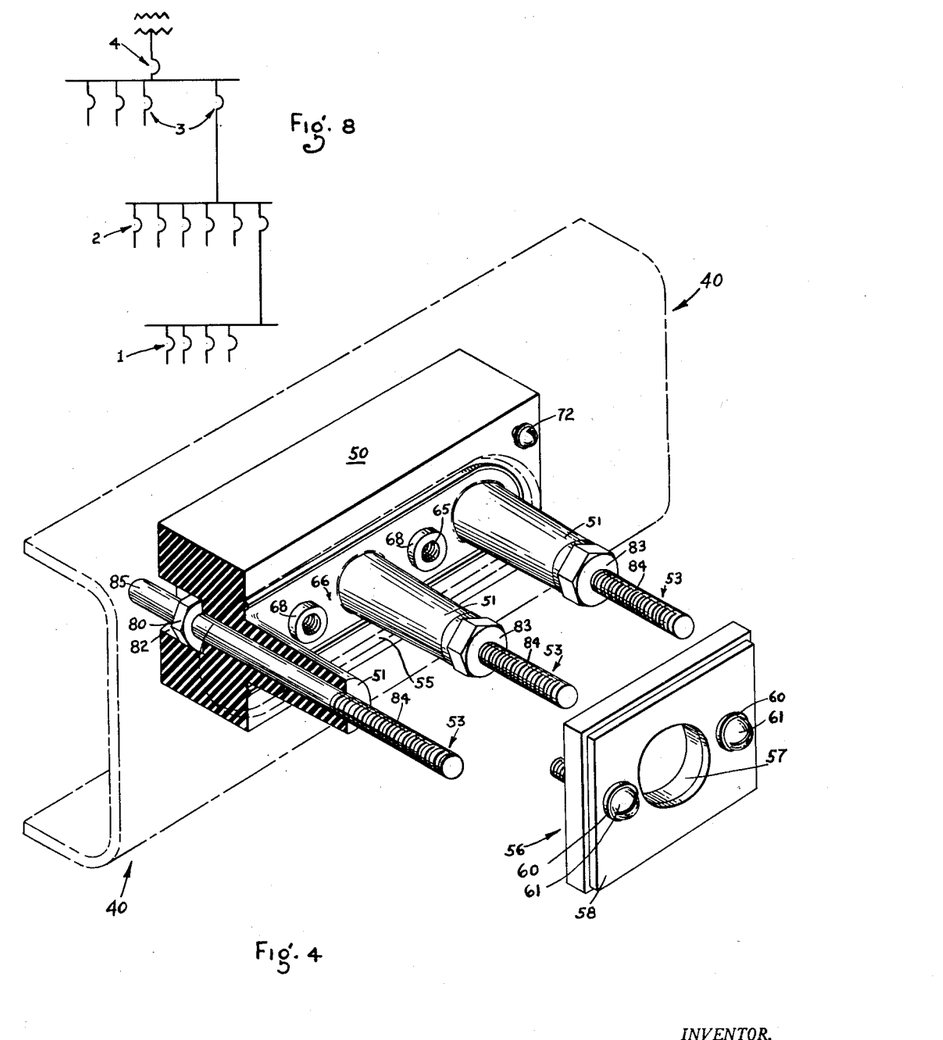
Figure 4 is an expanded view partly in cross section of the rear of the mounting means of our invention.
Figure 8 is a circuit diagram showing the circuit arrangement of circuit breakers in our novel switchboard.
Figure 5:
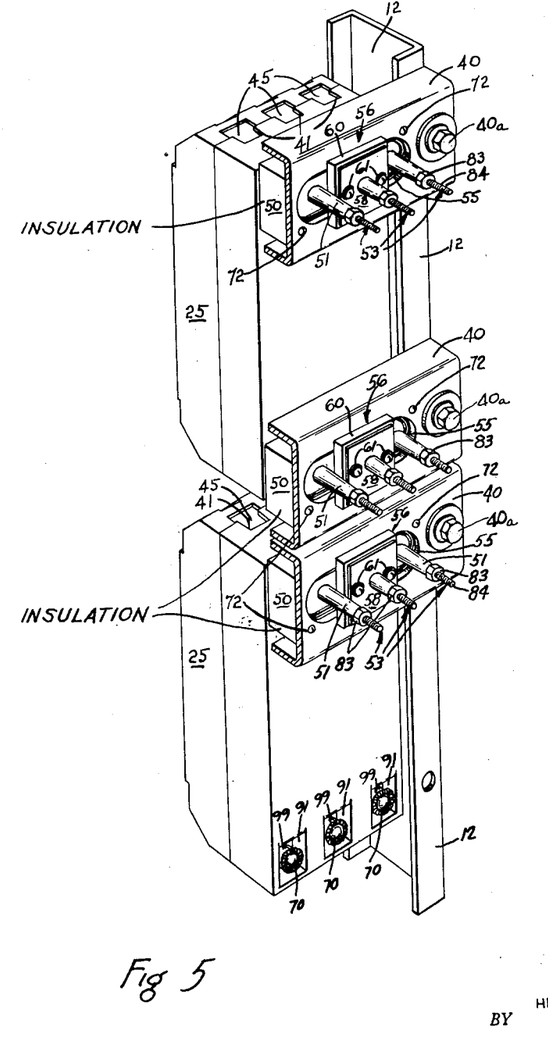
Figure 5 is a view in perspective of the rear of a portion of the switchboard again showing the specific mounting means.

The back of the channel 40, as seen in phantom in Figure 4 and in solid in Figure 5, is provided with an oblong cut-out 55 at each circuit breaker position to permit the tubular extensions 51 and the draw-out lugs 53 thereof to project therethrough to the back of the switchboard.

A clamping plate 56 (Figures 3, 4 and 5), which is wider than the oblong cut-out 55, has a central opening 57 adapting it to be fitted over the central tubular extension 51. The clamping plate 56 is made of Bakelite or any other suitable insulating material and is backed up by a sheet of manganese steel 58 in order to give strength thereto. Since manganese steel is non-magnetic, the use of this type of material for reinforcement prevents heating at this point.

Figure 3:
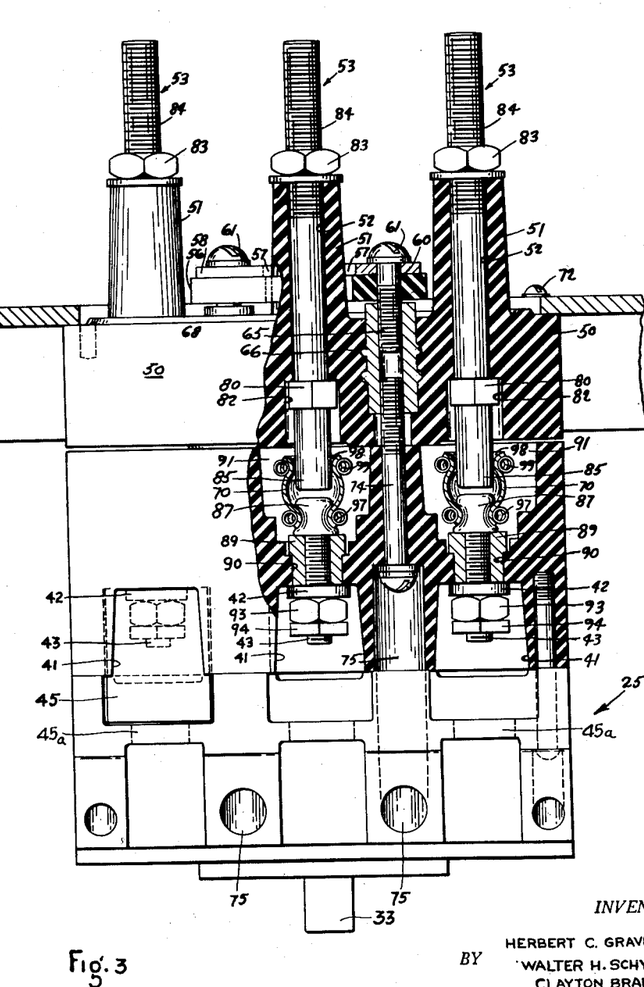
Figure 3 is a view partly in cross section taken on line 3—3 of Figure 2 looking in the direction of the arrows and showing the specific mounting means for the circuit breaker.

Clamping plate 56–58 is provided with a pair of opposite openings 60, 60 through which the bolts 61, 61 pass.

When the clamping plate is placed in position, as shown in Figures 3 and 5, so that the central opening 57 thereof is over the central extension 51 of the mounting block 50, the clamping plate bridges the cut-out 55 in the channel 40. The bolts 61 are then threaded into the tapped openings 65 in the metal inserts 66 of the mounting block 50.

The tightening of the bolts 61 clamps the back portion of the channel 40 between the mounting block 50 and the clamping plate 56.

The threaded insert 66 may, as will be seen from Figure 3, extend slightly out of the back end of the mounting block 50 at 68, so that a rigid metallic member may be provided for the clamping operation.

While the mounting block 50 is primarily designed to fill the channel 40 on which the circuit breakers 25 are mounted, it further serves as a means of adjusting the draw-out lugs 53 to accurately align the same with the separable contacts 70 of the circuit breakers. This adjustment can be obtained by hand tightening the bolts 61 in the upper and lower mounting blocks 50 and then putting the breaker 25 in place (as hereinafter described), after which the clamping bolts 61 may be fully tightened. Thus, during this operation, partial tightening of the clamping bolts 61 positions the mounting block 50 in place but permits it to be shifted slightly until the circuit breaker 25 is aligned with the draw-out lugs 53.

After this alignment is obtained, then the clamping bolts 61 may be tightened fully to secure the mounting block 50 permanently in place. When this final adjustment has been made, two self-tapping screws 72 are threaded through appropriate openings in the back of the channel 40 (see Figures 4 and 5) and into the material of the mounting block 50 to anchor the mounting block 50 in position and to prevent any possible movement.

When the circuit breaker is mounted in position, mounting screws 74 may be inserted through the openings 75 of the circuit breaker 25 and threaded into the front end of the tapped metal insert 66 to hold the circuit breaker firmly in position.

It will thus be obvious that the clamping bolts or screws 61 and the circuit breaker mounting bolts 74 are threaded into opposite ends of the same metal insert 66, so that these opposite bolts share the same metal insert.

By this arrangement, the plastic material of the mounting block 50 is relieved of strains since the bolts 61 and 74, being diametrically opposite and in the same piece, exert their forces in opposite directions neutralizing each other in their relation to the Bakelite of the mounting block 50. While the utilization of metal inserts in molded material is not new, it is believed that this arrangement for relieving strains is entirely novel.

The draw-out lugs 53 are made of copper and have hexagon head 80 which cooperate with similarly shaped hexagonal recesses 82 in the front of the mounting block 50. This prevents the turning of the draw-out lugs 53 when cables or bus bars are being mounted thereon.

The rear ends of the draw-out lugs 53 are provided with nuts 83 on the threaded ends 84 to facilitate the securement of cables or bus bars thereto. The front ends of the draw-out lugs 53 are smooth members which cooperate with separable contacts 70 of the circuit breaker 25.

The terminal 42 of the circuit breaker is provided with an opening, not shown, through which the bolts 43 pass.

The rear end of each bolt 43 is provided with the dumbbell shaped separable contact supporting member 87 of conductive material secured thereto in any appropriate manner.

A metal insert 89 is used to support the bolt 43 and to fill the opening 90 in the back of the circuit breaker.

The base of the circuit breaker is provided with depressions 91 registering with the openings 90 to provide a space for the separable contacts 70 and the ends 85 of the draw-out lugs 53.

Terminal 42 is conductively related to the bolt 43 by the nut 93 which is held in position by the lock nut 94.

The separable contact 70 is held in position on the dumbbell shaped terminal end 87 by the garter spring 97. This separable contact member 70 is a flexible conducting member, which is well known in the art.

The rear ends of the separable contact members 70 are provided with the flaring portion 98, adapting them to slip readily over the ends 85 of the draw-out lugs 53, and are held in efficient current conducting relation with the ends 85 of the draw-out lugs by the garter springs 99.

By this means, therefore, a simplified dead front switchboard is provided which is simple in construction, facilitates replacement and repair, and permits the circuit breakers to be accessible entirely from the front for tests and adjustment operations and protects the operator.

Figure 6:
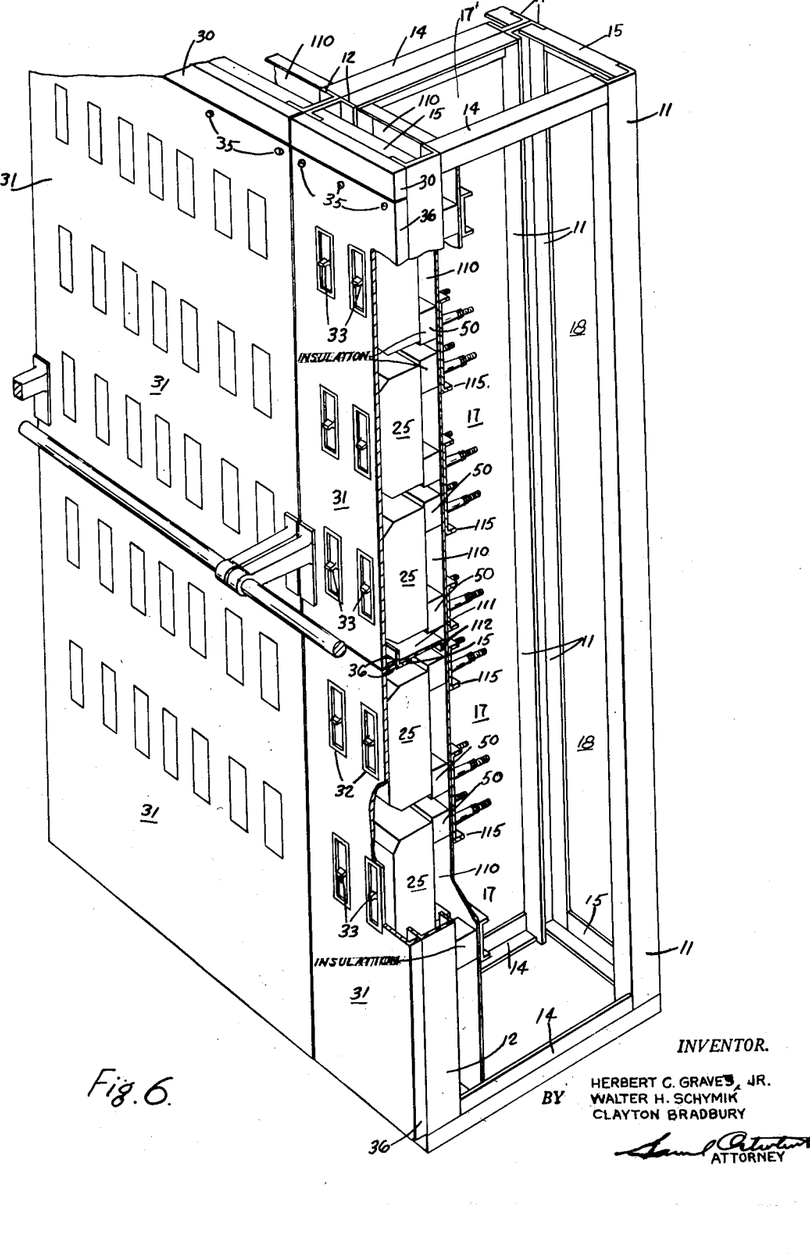
Figure 6 is a view in perspective showing a slight modification of the switchboard of Figure 1.

Many modifications of our novel switchboard structure should now be obvious to those skilled in the art. Thus, as shown in Figure 6, an additional steel panel 110 may be provided between the circuit breakers and the buses along the entire height and width of the switchboard; this increases the safety feature of the switchboard so equipped by preventing any breakdown in the circuit breakers from spreading to the bus bars or the cables.

The steel panel 110 is supported between the horizontal frame members 14, 14 and is appropriately spaced from the front horizontal frame members 15 by the spacing plates 111 which are provided with the small flange 112 secured in any suitable manner, as, for instance, by welding, to the steel plate 110 and in any suitable manner to the front frame members 15.

This construction, in addition to the added safety feature, obviates the necessity for utilizing a plurality of separate channel members 40 shown in Figure 1. That is, the steel plate 110 has the appropriate mounting blocks 50 secured thereto in the same manner as the mounting blocks 50 are secured to the channels of Figures 3, 4 and 5; and the steel plate 110 has a cut-out similar to the cut-out 55 at each mounting block position.

The steel plate 110 may, however, be reinforced at the mounting block positions by additional rigidifying U plates 115, 115 which are of channel shape only for the purpose of rigidity and to reinforce the conductive plate 110 at the point where the mounting blocks for the circuit breaker are supported.

Figure 7:
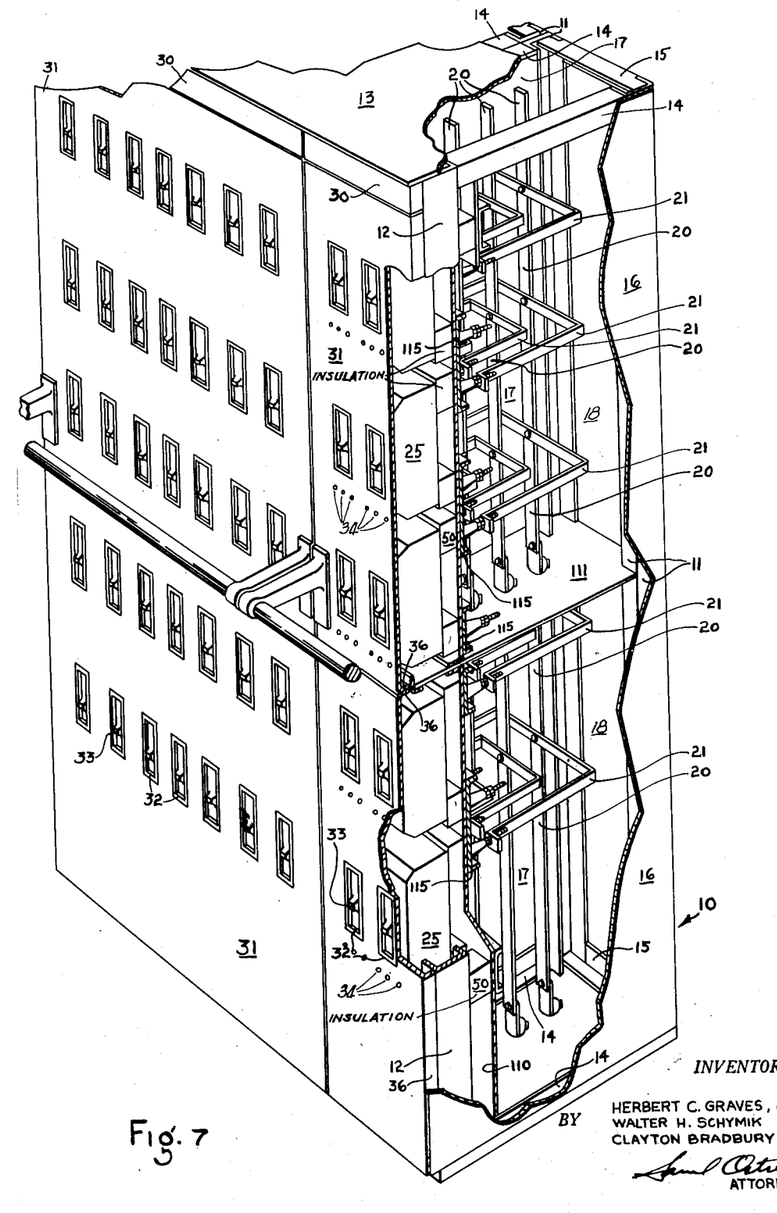
Figure 7 is a view in perspective showing a further modification of our novel switchboard.

In Figure 7, we have shown a switchboard with top plates 13 and side plates 16 broken away. This switchboard has essentially the same construction as that provided in Figure 6, except that, in addition to the steel panel 110 between the circuit breakers and the bases, a steel partition 111 is provided to separate groups of buses and their associated circuit breakers into cubicles. Only a horizontal partition 111 is shown to separate the switchboard into two sections; any number of vertical and horizontal partitions may be used to form any desired number of separate cubicles.

By this means, we divide the board into two sections and in the case of a fault, causing fire, prevent the spread of that fire from one section to another. Likewise any break down in the circuit breakers is prevented from spreading to the bus work by the grounded metal barrier 110.

These particular panelboards and their application to navy vessels, presented some special problems that might not arise commercially.

It is frequently desirable under battle conditions, to lock circuit breakers in against their normal function. This is done in order to maintain maximum service as long as practical regardless of the possible damage to equipment.

Under some circumstances, with breakers locked closed, it is inevitable that in the event of a fault or a short circuit, that some of the smaller breakers will be taxed beyond their capacity and therefore break down. In such cases it is desirable to prevent the fire caused by this break down from spreading to other parts of the panelboard, therefore, it is desirable to segregate groups of breakers and the bus work feeding them.

This will be obvious from the circuit diagram of Figure 8 representing a standard circuit breaker arrangement on a vessel. Circuit breaker 4 is the main breaker which takes power from the transformer or other source and protects the feeder breakers 3. Each breaker 3 is connected to a bus from which current is taken from subsidiary feeders. Subsidiary feeders are protected by circuit breakers 2, each of which is connected to a bus from which the loads, protected by circuit breakers 1, obtain current. It will be clear that if each subsidiary feeder breaker 2 and its associated load breakers 1 and their related buses and cables are contained in a single compartment or cubicle, any fire in that compartment will be confined to that subsidiary feeder breaker 2 and its associated load breakers 1 only. In less elaborate systems or switchboards, each main feeder breaker 3 and its associated subsidiary feeder breakers 2 and load breakers 1 may be in one compartment; in that case, the switchboard for the system of Figure 8 would have four compartments.

The locking feature 44, Figure 2, on the circuit breakers provides means for holding the circuit breakers closed during battle conditions to prevent false tripping under physical shock or to permit equipment to continue to operate during a battle even though fault conditions occur. The use of this locking feature makes the cubicle or compartment structure of Figure 7 important to prevent spread of the fire even though circuit breakers are destroyed by excess current.

The disconnecting elements 85—70 (Figure 3) are in front of the barrier 110 of Figures 6 and 7 and are protected by the Bakelite of the circuit breaker casing.

An additional and desirable feature of this invention is the location of prod holes 45a (Figure 2), for test purposes, in the front of the breakers. These holes are carried through the front of the panelboard (at 34 of Figure 7). Provision is thus made for testing circuit breakers without sacrificing any of the safety features already described. It might be well to note that while these holes are provided at both the line and load side of the circuit breaker casing they need only be carried through the panelboard on the load side.

In the foregoing, we have described our invention only in connection with preferred specific embodiments thereof. Many variations and modifications of the principles of our invention within the scope of the description herein are obvious. Accordingly, we prefer to be bound not by the specific disclosures herein but only by the appended claims.

We claim:

1. A swtichboard mounting for circuit interrupter comprising a channel member; a support therefor; an insulating supporting insert secured in said channel; circuit connecting members carried by said insulating supporting insert; said circuit connecting members projecting beyond said insulating supporting insert on opposite sides; the projections of said circuit connecting members on one side forming disconnect contacts for said circuit interrupter; means including said disconnect contacts for permitting automatic disconnection of said interrupter from its circuit on withdrawal of said interrupter from said switchboard; the projections of said circuit connecting memrbers on the other side each forming a connecting means to a circuit; an opening in a wall of said channel; said projections on said other side of said insert passing through said opening.

2. A switchboard mounting for a circuit interrupter comprising a channel member; a support therefor; an insulating supporting insert secured in said channel; circuit connection members carried by said insulating supporting insert; said circuit connecting members projecting beyond said insulating supporting insert on opposite sides; the projections of said circuit connecting members on one side forming disconnect contacts for said circuit interrupter; mean including said disconnect contacts for permitting automatic disconnection of said interrupter from its circuit on wtihdrawal of said interrupter from said switchboard; the securing means for said insert in said channel comprising a tapped metallic member in said insert parallel to said circuit connecting member and normal to a wall of said channel; a bolt introduced in said metallic member from the side thereof adjacent said channel wall to secure said insert to said channel; said circuit interrupter having a housing; an opening in said housing alignable with said tapped metallic member on the side opposite said channel wall; and a bolt intrnducible through said opening into said tapped metallic member to secure said housing in position.

3. A switchboard mounting for a circuit interrupter comprising a channel member; a support therefor; an insulating supporting insert secured in said channel; circuit connecting members carried by said insulating supporting insert; said circuit connecting members projecting beyond said insulating supporting insert on opposite sides; the projections of said circuit connecting members on one side forming disconnect contacts for said circuit interrupter; the projections of said circuit connecting members on the other side each forming a connecting means to a circuit means including said disconnect contacts for permitting automatic disconnection of said interrupter from its circuit on withdrawal of said interrupter from said switchboard; an opening in a wall of said channel; said projections on said other side of said insert passing through said opening; the securing means for said insert in said channel comprising a tapped metallic member in said insert parallel to said circuit connecting member and normal to a wall of said channel; a bolt introduced in said metallic member from the side thereof adjacent said channel wall to secure said insert to said channel.

4. A switchboard mounting for a circuit interrupter comprising a channel member; a support therefor; an insulating supporting insert secured in said channel; circuit connecting members carried by said insulating supporting insert; said circuit connecting members projecting beyond said insulating supporting insert on opposite sides; the projections of said circuit connecting members on one side forming disconnect contacts for said circuit interrupter; the projections of said circuit connecting members on the other side each forming a connecting means to a circuit; means including said disconnect contacts for permitting automatic disconnection of said interrupter from its circuit on withdrawal of said interrupter from said switchboard; an opening in a wall of said channel; said projections on said other side of said insert passing through said opening; the securing means for said insert in said channel comprising a tapped metallic member in said insert parallel to said circuit connecting member and normal to a wall of said channel; a bolt introduced in said metallic member from the side thereof adjacent said channel wall to secure said insert to said channel; said circuit interrupter having a housing; an opening in said housing alignable with said tapped metallic member on the side opposite said channel wall; and a bolt introducible through said opening into said tapped metallic member to secure said housing in position.

5. A switchboard mounting for a circuit interrupter comprising a channel member; a support therefor; an insulating supporting insert secured in said channel; circuit connecting members carried by said insulating supporting insert; said circuit connecting members projecting beyond said insulating supporting insert on opposite sides; the projections of said circuit connecting members on one side forming disconnect contacts for said circuit interrupter; the projections of said circuit connecting members on the other side each forming a connecting means to a circuit; an opening in a wall of said channel; said projections on said other side of said insert passing through said opening; the securing means for said insert comprising a clamping plate surrounding at least one of said projections on said other side and held against the outer surface of the portion of said channel wall surrounding said opening; a bolt passing through said clamping plate and said opening into said insert, edges of said channel wall defining said opening being clamped between said clamping plate and said insert.

6. A dead front switchboard comprising a mounting for a plurality of circuit interrupters; each circuit breaker mounting comprising a channel member; a support therefor; an insulating supporting insert secured in said channel; circuit connecting members carried by said insulating supporting insert; said circuit connecting members projecting beyond said insulating supporting insert on opposite sides; the projections of said circuit connecting members on one side forming disconnect contacts for said circuit interrupter; means including said disconnect contacts for permitting automatic disconnection of said interrupter from its circuit on withdrawal of said interrupter from said switchboard; the projections of said circuit connecting members on the other side each forming a connecting means to a circuit; an opening in a wall of said channel; said projections on said other side of said insert passing through said opening.

HERBERT C. GRAVES, Jr.
WALTER HAINES SCHYMIK.
CLAYTON BRADBURY.

REFERENCES CITED

The following references are of record in the file of this patent:

UNITED STATES PATENTS

| Number | Name | Date |
| --- | --- | --- |
| 1,119,718 | Olley | Dec. 1, 1914 |
| 1,141,359 | Power | June 1, 1915 |
| 1,166,149 | Olley | Dec. 28, 1915 |
| 1,872,296 | Jennings | Aug. 16, 1932 |
| 1,938,309 | Williams | Dec. 5, 1933 |
| 2,020,913 | Schramm | Nov. 12, 1935 |
| 2,027,743 | Merkel | Jan. 14, 1936 |
| 2,050,378 | Randall | Aug. 11, 1936 |
| 2,086,424 | Koehler | July 6, 1937 |
| 2,210,696 | West | Aug. 6, 1940 |
| 2,225,791 | Nau et al. | Dec. 24, 1940 |
| 2,288,270 | Dorfman | June 30, 1942 |
| 2,331,255 | West | Oct. 5, 1943 |
| 2,343,548 | Graves | Mar. 7, 1944 |